H. M. DAGGETT.
TIRE HOLDER.
APPLICATION FILED DEC. 14, 1917.
1,295,442.
Patented Feb. 25, 1919.
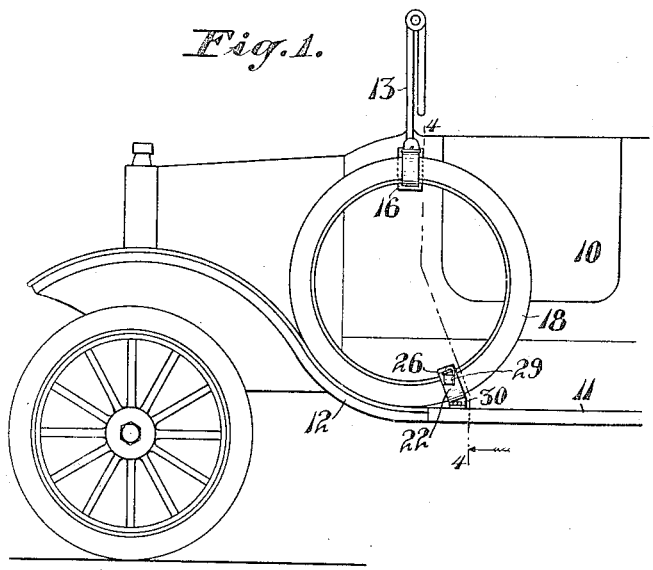
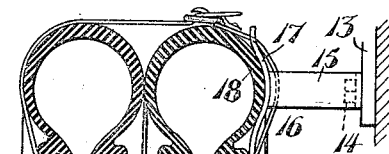
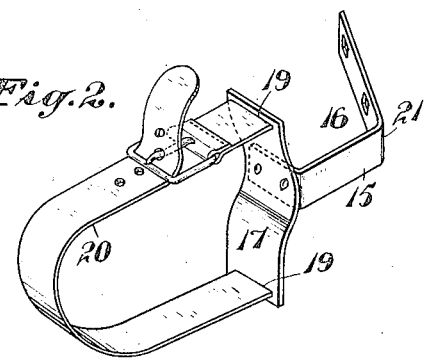
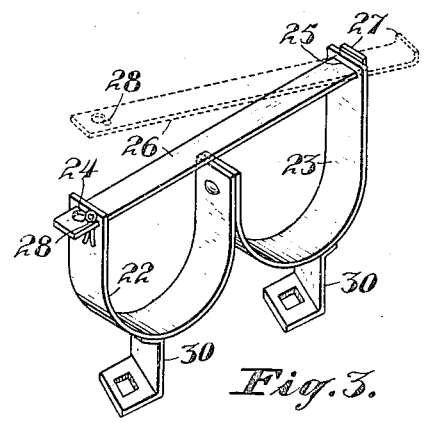
INVENTOR.
Harry M. Daggett.
BY
Strong & Townsend
ATTORNEYS

UNITED STATES PATENT OFFICE.

HARRY M. DAGGETT, OF OAKLAND, CALIFORNIA.

TIRE-HOLDER.

1,295,442.  Specification of Letters Patent.  Patented Feb. 25, 1919.

Application filed December 14, 1917. Serial No. 207,085.

*To all whom it may concern:*

Be it known that I, HARRY M. DAGGETT, a citizen of the United States, residing at Oakland, in the county of Alameda and State of California, have invented new and useful Improvements in Tire-Holders, of which the following is a specification.

This invention relates to a tire holder, and particularly pertains to a holder for securing extra tires along the running board of an automobile.

There has been a demand for a tire holder adapted to accommodate one or more tires and hold them in place upon the body of an automobile, especially cars of the "Ford" type, requiring a holder which may be inexpensively manufactured, readily applied and will securely lock the tires against removal. It is, therefore, the principal object of this invention to provide a tire holder especially adapted to meet these needs.

The present invention, therefore, provides a device which is easily and cheaply manufactured, readily secured in place upon the vehicle by fastening members already supplied thereby, and may be conveniently manipulated to receive the tires and allow their removal therefrom, at the same time providing an effective means for positively locking the tires in position. Another object of this invention is to provide a tire holder which will support tires in a manner to conserve the space along the running board of the car, this being done in the present instance by holding the tires to closely conform to the contour of the front mud guards of the automobile. A further object of this invention is to provide a tire holder, the upper supporting element of which will not in any way obstruct the tires and which will not appear unsightly when the holder is not in use.

The invention is illustrated, by way of example, in the accompanying drawings, in which—

Figure 1 is a fragmentary view in side elevation, illustrating the holder as applied to the side of an automobile.

Fig. 2 is a view in perspective, illustrating the upper fastening element.

Fig. 3 is a view in perspective, illustrating the lower fastening element and tire receptacle.

Fig. 4 is a view, in transverse section, as seen on the line 4—4 of Fig. 1, and particularly discloses the coöperating action of the two fastening elements in relation to each other.

Referring more particularly to the drawings, 10 indicates the body of an automobile, preferably of the "Ford" type, having a horizontally extending running board 11 united at its forward end with a mud guard 12 of conventional design. Commonly secured to an automobile of this character is a wind shield frame 13, which is bolted to the side of the vehicle body by bolts 14.

In the present instance these bolts 14 are utilized to secure a bracket 15 of the upper fastening element 16. This bracket is particularly shown in Fig. 2, where it will be seen to possess a substantially vertically extending strap plate 17 bent to conform to the side of a tire casing 18. Formed laterally through the plate, at its opposite ends, are slotted openings 19 through which a fastening strap 20 extends. This strap is fitted with a suitable buckle which allows it to be adjustably secured around the upper portion of the tires. Rigidly secured to the back of the plate 17 and extending perpendicularly therefrom is an angle bracket 21 having a forwardly bent extension fitted with openings through which the bolts 14 pass and by which the bracket is rigidly held in position.

The lower fastening device is particularly shown in Fig. 4 and consists of complementary tire receptacles 22 and 23, which are formed from strap metal and provide upturned U-shaped seats into which the tire casings may be placed and by which they will be supported. It will be understood that these receptacles may be formed integrally from a single bar of metal or may be separately formed and riveted together, if desired. The opposite ends of the two receptacles extend a suitable distance above the horizontal plane of the adjacent ends of the receptacles and are formed with laterally disposed, slotted openings 24 and 25, through which a lock bar 26 is adapted to extend. This bar is formed with a hooked end 27 which coöperates with the upper edge of the receptacle 23 to form a hinge and allow the bar to swing vertically, when desired. The opposite end of the bar is flat and may be inserted through the slotted opening 24 in the receptacle 22, after the tires have been placed in position.

Attention is directed to the fact that the hooked portion of the bar is not permanently secured to the receptacle 23 but allows the bar to have a sliding movement in relation thereto, thus making it possible to withdraw the bar entirely or place it in its locking position. A cotter-pin perforation 28 is formed through the flat, outer end of the bar and will accommodate a pin for temporarily holding the bar in its obstructing position. A padlock 29 may also be provided and caused to engage the outer end of the bar in a manner to prevent the removal thereof, as particularly shown in Fig. 4.

Especial attention is directed to the manner in which the tire receptacles support the tire in relation to the running board and the mud-guard of the vehicle. These receptacles are formed with bracket feet 30 which are perforated to receive bolts 31 used to secure the forward end of the running board 11 to the mud guard 12. These brackets are bent forwardly to hold the receptacles at an inclination to the vertical and thus throw the center of the tire considerably ahead of the point of fastening of the receptacles to the running board. This causes the tires to occupy a part of the space directly above the curve of the mud guard, the radius of this curve and the mud guard coinciding.

By this arrangement the tires may be thrown to an extreme forward position and will not only be rigidly held but will give the vehicle a more sightly appearance than would have been possible if the tires had been supported directly above their receptacles.

In operation, the upper holder 16 and the lower receptacles are secured to the body and running board by the bolts 14 and 31, respectively. When in position, the tires 18 may be seated within the receptacles and thereafter securely strapped to the body of the vehicle by the strap 20 comprising a part of the upper fastening. The lock bar 26 may then be swung downwardly and moved forwardly to project its flat end through the slot 24, thereafter allowing the padlock 29 to be placed in position and closed. When the holder is not in use, the lock bar 26 may be removed, if desired, and the strap 20 taken off of the bracket 15 or neatly wrapped therearound. This will render the holder unobjectionable and will not materially detract from the appearance of the vehicle.

It will thus be seen that the device here disclosed is simple in its construction, may be inexpensively manufactured and readily applied to an automobile in a convenient and desirable manner, and thereafter will act to securely and detachably hold the vehicle tires in position.

While I have shown the preferred form of my invention as known to me, it will be evident that various changes in the combination, construction and arrangement of the parts may be made by those skilled in the art without departing from the spirit of my invention.

Having thus described my invention, what I claim and desire to secure by Letters Patent is—

1. In a tire holder, a bracket having an out-turned end, a vertical flexible strip secured at approximately its center to the out-turned end of the bracket and having its ends free and slotted and extending respectively for a distance above and below said out-turned end of the bracket, said strip being shaped to engage a side of the tire, and a strap engageable over the tire and through the slots and engaged with the back face of the strip and with the out-turned end of the bracket whereby to draw the strip into conformable engagement with said side of the tire on each side of the out-turned end of the bracket.

2. In a tire holder for automobiles, an upper tire engaging member formed for securement to the automobile body, and a lower tire engaging member having means to receive the bolts which latter secure the running board to the forward mud guard, so as to be held in position by said bolts, said lower member being formed to support the tire against and in conformable engagement with the forward mud guard and at a point to the rear of the center of the tire and radially of the latter whereby said members coöperate with the forward mud guard to hold the tire at three points.

3. In a tire holder, a tire receiving member having vertical spaced portions slotted at their upper ends, a lock bar slidable through each of the slots and having one end out-turned to abut one of the vertical portions to limit sliding of the bar in one direction, said slots being formed so as to allow the bar to be completely disengaged from said member upon sliding of the bar in one direction, and means to lock the bar engageable with the other end thereof.

In testimony whereof I have hereunto set my hand in the presence of two subscribing witnesses.

HARRY M. DAGGETT.

Witnesses:
JOHN H. HERRING,
W. W. HEALEY.